June 7, 1949.    R. W. FERNSTRUM    2,472,290
HELICOPTER KITE
Filed March 18, 1946

Inventor
Robert W. Fernstrum
by Barthel + Bugbee
Att'ys

Patented June 7, 1949

2,472,290

UNITED STATES PATENT OFFICE 2,472,290

HELICOPTER KITE

Robert W. Fernstrum, Detroit, Mich., assignor to Joy Products Company, Menominee, Mich., a corporation of Michigan Application March 18, 1946, Serial No. 655,253

12 Claims. (Cl. 244—154)

This invention relates to aerial devices, and in particular to kites.

One object of this invention is to provide a helicopter kite having rotary sustaining rotors thereon arranged to rotate when the kite is in flight while attached to a string.

Another object is to provide a helicopter kite having a pair of sustaining rotors mounted outboard of the fuselage and arranged to rotate in the same or opposite directions when the kite is in flight while attached to a string.

Another object is to provide a helicopter kite, as set forth in the object immediately preceding, wherein the rotors are mounted with their axes tilted upwardly toward an intersection with the vertical plane passing through the fuselage.

Another object is to provide a helicopter kite, as set forth in the preceding objects, wherein the fuselage near its rearward end is provided with a vertical stabilizing fin and a horizontal tail plane, the latter being preferably tilted at a negative angle of incidence.

Another object is to provide a helicopter kite having a pair of sustaining rotors mounted in tandem on the fuselage when the kite is in flight while attached to a string.

Another object is to provide a helicopter kite wherein the kite string is connected to a point at a relatively high location.

Other objects and advantages of the invention will become apparent during the course of the following description of the accompanying drawing, wherein.

Figure 1:
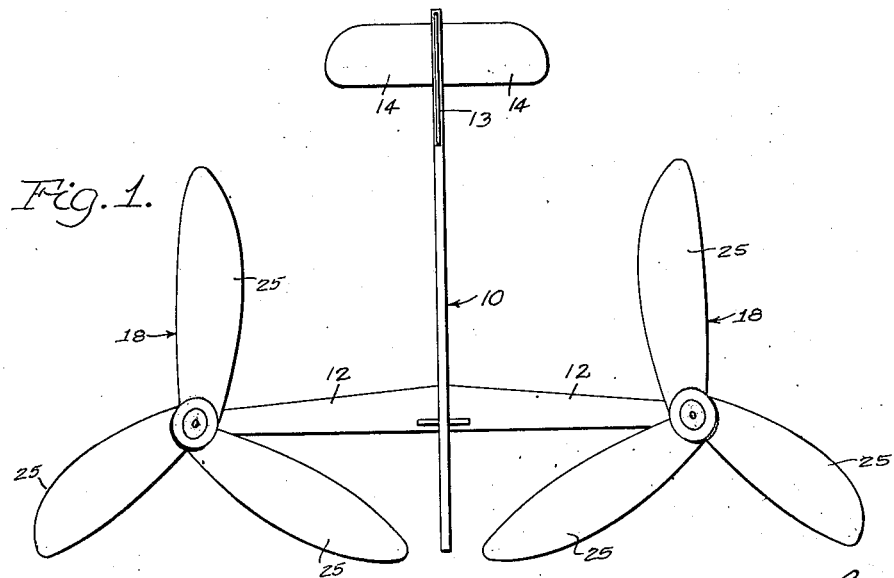
Figure 1 is a top plan view of a helicopter kite according to a preferred embodiment of the invention.
Figure 2:
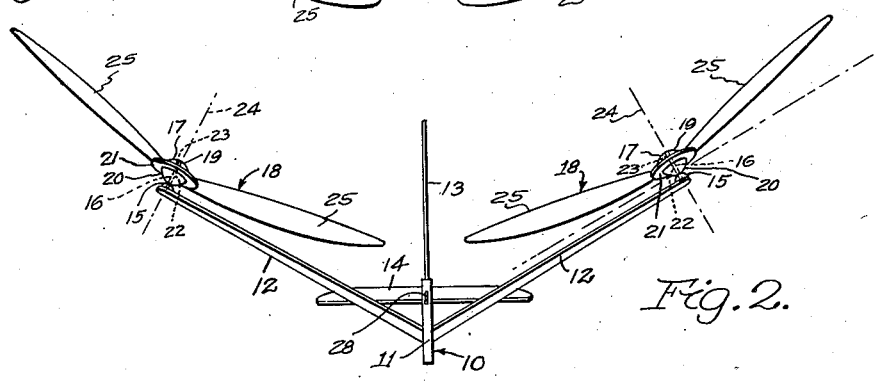
Figure 2 is a front elevation of the helicopter kite shown in Figure 1.
Figure 4:
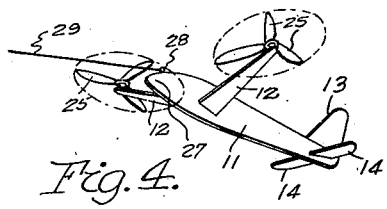
Figure 4 is a perspective view showing the helicopter kite of Figures 1 to 3 inclusive in flight.
Figure 3:
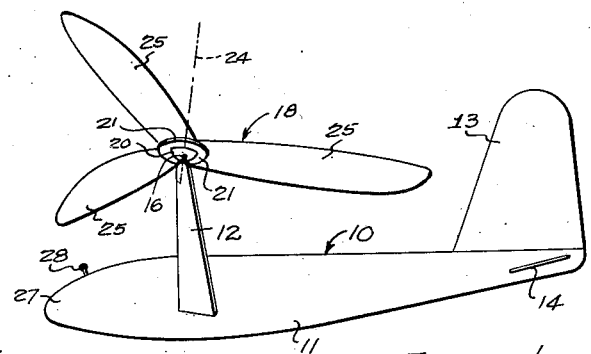
Figure 3 is a side elevation of the helicopter kite shown in Figures 1 and 2.

Referring to the drawings, Figures 1 to 3 show a preferred embodiment of the helicopter kite of this invention, generally designated 10 as including a fuselage 11, preferably consisting of a thin longitudinal member or structure of light-weight material, such as balsa wood. Mounted in a forward position on the fuselage 11 is a pair of outriggers 12 of flat narrow wing form, set at a slight positive incidence relatively to the longitudinal axis of the fuselage 11, for example about 6°. The outriggers 12, for lateral stability (Figure 2) are mounted on the fuselage with a positive dihedral angle, for example approximately 30°. The outriggers may likewise be of light-weight material such as balsa wood.

Mounted near the rearward end of the fuselage 11 is a vertical stabilizing fin 13 and also a horizontal tail plane 14, both being of light material, such as balsa wood, and secured in any suitable manner, such as in slots in the fuselage 11. The tail plane 14 is set at a negative angle of incidence relatively to the longitudinal axis of the fuselage 11, for example approximately 10°.

The outriggers 12 at their outer ends are provided with projecting members 15 forming bosses in which the lower ends of pivot pins 16 are secured. Rotatably mounted upon the pivot pins 16 are the hubs 17 of rotors, generally designated 18. The hubs 17 consist of approximately hemispherical members 19 and 20 secured on opposite sides of a disc 21 and having bores 22 and 23 through which the pivot pins 16 pass. The upper ends of the pivot pins are slightly enlarged to retain the hubs 17 in position. When viewed in front elevation (Figure 2), the axes of the pivot pins 16, and therefore the axes of rotation 24 of the rotors 18 are approximately perpendicular to the outriggers 12, and since the latter are mounted at positive dihedral angles, the axes of rotation 24 are inclined upwardly toward an intersection with the vertical plane passing through the fuselage 11 and stabilizing fin 13. When viewed in side elevation, however, (Figure 3) the axes of rotation 24 are tilted upwardly and slightly rearwardly, thus tilting the blades 25 slightly upwardly and rearwardly.

Secured to the hubs 17 of the rotors 18 are rotor blades 25, preferably three in number and formed of light-weight material, such as balsa wood. The rotor blades 25 are secured rigidly to the hubs 17 with a slightly negative angle of incidence, for example about 6°, and with a positive dihedral angle of about 12°. In other words, the blades 25 are tilted slightly upwardly relatively to the axes of rotation 24 (Figure 2), and when viewed in side elevation (Figure 3) are tilted slightly upwardly and rearwardly. The rotor blades 25 may be of any suitable length, in overall diameter approaching the length of the fuselage 11, the aspect ratio of each blade being approximately 4 or 5. It is found preferable to construct the rotors with oppositely pitched blades so as to rotate in opposite directions, but they may also be arranged to rotate in the same direction. Attached to the nose portion 27 of the fuselage is a connection 28 such as a screw-eye for the attachment of a kite string 29.

In the operation of the invention, with the kite string 29 secured to the eye 28, the helicopter kite 10 is launched by the operator running toward the oncoming wind and pulling the kite with him, at the same time paying out the kite line 29 as the kite 10 rises. With the parts arranged and positioned as described above, the kite assumes a position with the fuselage 11 tilted upward, giving the rotors 18 a high angle of attack relatively to the horizontal direction of the wind, the tail plane 14 assuming a substantially horizontal position approximately aligned with the relative air flow of the wind. The angle of tilt of the tail plane 14 is set at a position giving a not-too-high rate of climb for average wind velocities, and is preferably made adjustable to allow for widely varying wind velocities.

The location of the various parts as described above is such that the component of the upward thrust of the rotors providing the sustaining force normally lies between the downward component of thrust due to the kite string 29 at the eye 28 and the downward component of the thrust due to the weight of the kite, which can be considered as concentrated at the center of gravity of the kite located in the fuselage 11 rearwardly of the outriggers 12. This action provides horizontal stability and balance to the kite.

Lateral stability is imparted by the fact that the advancing blade 25 due to its higher relative air speed has more lift than the retreating blade, hence the rotor lift component is applied outboard of the rotor axis 24. The fact that the rotors 18 are mounted with dihedrally inclined blades 25 also imparts lateral stability. The component of thrust due to the tail plane 14 also is in a direction counterbalancing the thrust due to the pull of the kite string at the forward end of the fuselage 11, thereby providing stability in a fore and aft direction. The tail fin 13 also assists in imparting directional stability to the kite and prevents side sway of the fuselage 11 during flight.

Figure 5:
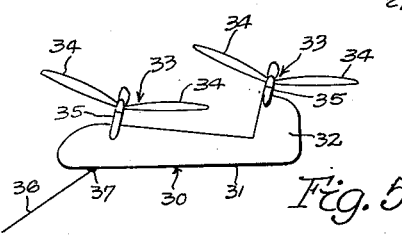
Figure 5 is a side elevation of a helicopter kite according to a modification of the invention wherein the rotors are mounted in tandem on the fuselage.

The modified helicopter kite 30 shown in Figure 5 consists of a fuselage 31 similar to the fuselage 11 of the form of the invention shown in Figures 1 to 4 inclusive. The fuselage 31 may be formed from a piece of balsa wood with a tail fin 32 either integral therewith or separately attached thereto like the tail fin 13 in Figure 3. The rotors 33 are similar to the rotors 18 in Figure 3 and have similar blades 34. They are mounted in tandem, however, upon the ends of struts 35 and tilted in a manner similar to the mounting and tilting of the rotors 18 upon the outriggers 12. The struts 35 are mounted at their lower ends upon the fuselage 31 and tail fin 32 in any suitable manner, as by slotting them longitudinally and gluing them in position with the fuselage 31 and tail fin 32 inserted in the slots. The tail plane 14 is not necessary with the form shown in Figure 5, as the rear rotor 33 eliminates the need for it. The string 36 by which the kite is towed and flown is attached to a member 37 similar to the screw-eye 28 inserted in the forward portion of the fuselage 30. The operation of the modified kite shown in Figure 5 is similar to that of the form shown in Figures 1 to 4 inclusive, hence requires no reiteration.

While I have shown and described my invention in detail, it is to be understood that the same is to be limited only by the appended claims, for many changes may be made without departing from the spirit and scope of my invention.

What I claim is:

1. A helicopter kite comprising a frame including a pair of oppositely projecting outriggers, a pair of plural-blade rotors rotatably mounted on said outriggers, a stabilizing plane structure disposed on said frame rearwardly of said outriggers, and a connection for attaching a flexible towing member to the forward portion of said frame, the axes of rotation of said rotors being disposed in upwardly converging directions.

2. A helicopter kite comprising a frame including a pair of oppositely projecting outriggers, a pair of plural-blade rotors rotatably mounted on said outriggers, a stabilizing plane structure disposed on said frame rearwardly of said outriggers, and a connection for attaching a flexible towing member to the forward portion of said frame, the axes of rotation of said rotors being tilted in an upwardly and rearwardly inclined converging relationship with reference to the longitudinal axis of said frame.

3. A helicopter kite comprising a frame including a pair of oppositely projecting outriggers secured to the forward portion thereof, a pair of plural-blade rotors rotatably mounted on the outer portions of said outriggers, a stabilizing plane structure disposed on said frame rearwardly of said outriggers, and a connection for attaching a flexible towing member to the forward portion of said frame, the blades of each rotor being positioned at a positive dihedral angle relatively to the axis of rotation thereof.

4. A helicopter kite comprising a frame including a pair of oppositely projecting outriggers, a pair of plural-blade rotors rotatably mounted on said outriggers, a stabilizing plane structure disposed on said frame rearwardly of said outriggers, and a connection for attaching a flexible towing member to the forward portion of said frame, the axes of rotation of said rotors being tilted in upwardly inclined converging relationship with reference to the longitudinal axis of the frame and the blades of each rotor being positioned at a positive dihedral angle relatively to its axis of rotation.

5. A helicopter kite comprising a frame including a pair of oppositely projecting outriggers, a pair of plural-blade rotors rotatably mounted on said outriggers, a stabilizing plane structure disposed on said frame rearwardly of said outriggers, and a connection for attaching a flexible towing member to the forward portion of said frame, the axes of rotation of said rotors being tilted in upwardly and rearwardly inclined converging relationship with reference to the longitudinal axis of the frame and the blades of each rotor being positioned at a positive dihedral angle relatively to its axis of rotation.

6. A helicopter kite comprising a frame including a pair of oppositely projecting outriggers secured to the forward portion thereof, a pair of plural-blade rotors rotatably mounted on the outer portions of said outriggers, a stabilizing plane structure disposed on said frame rearwardly of said outriggers, and a connection for attaching a flexible towing member to the forward portion of said frame, said plane structure including an approximately vertical tail fin and an approximately horizontal tail plane disposed at a negative angle of incidence.

7. A helicopter kite comprising a frame including a pair of oppositely projecting outriggers, a pair of plural-blade rotors rotatably mounted on said outriggers, a stabilizing plane structure disposed on said frame rearwardly of said outriggers, and a connection for attaching a flexible towing member to the forward portion of said frame, said plane structure including an approximately horizontal tail plane disposed at a negative angle of incidence, the axes of rotation of said rotors being disposed in upwardly converging directions.

8. A helicopter kite comprising a frame including a pair of oppositely projecting outriggers, a pair of plural-blade rotors rotatably mounted on said outriggers, a stabilizing plane structure disposed on said frame rearwardly of said outriggers, and a connection for attaching a flexible towing member to the forward portion of said frame, said plane structure including an approximately horizontal tail plane disposed at a negative angle of incidence, the axes of rotation of said rotors being tilted in an upwardly and rearwardly inclined converging relationship with reference to the longitudinal axis of said frame.

9. A helicopter kite comprising a frame including a pair of oppositely projecting outriggers secured to the forward portion thereof, a pair of plural-blade rotors rotatably mounted on the outer portions of said outriggers, a stabilizing plane structure disposed on said frame rearwardly of said outriggers, and a connection for attaching a flexible towing member to the forward portion of said frame, said plane structure including an approximately horizontal tail plane disposed at a negative angle of incidence, the blades of each rotor being positioned at a positive dihedral angle relatively to the axis of rotation thereof.

10. A helicopter kite comprising a frame including a pair of oppositely projecting outriggers, a pair of plural-blade rotors rotatably mounted on said outriggers, a stabilizing plane structure disposed on said frame rearwardly of said outriggers, and a connection for attaching a flexible towing member to the forward portion of said frame, said plane structure including an approximately horizontal tail plane disposed at a negative angle of incidence, the axes of rotation of said rotors being tilted in upwardly inclined converging relationship with reference to the longitudinal axis of the frame and the blades of each rotor being positioned at a positive dihedral angle relatively to its axis of rotation.

11. A helicopter kite comprising a frame including a pair of oppositely projecting outriggers, a pair of plural-blade rotors rotatably mounted on said outriggers, a stabilizing plane structure disposed on said frame rearwardly of said outriggers, and a connection for attaching a flexible towing member to the forward portion of said frame, said plane structure including an approximately horizontal tail plane disposed at a negative angle of incidence, the axes of rotation of said rotors being tilted in upwardly and rearwardly inclined converging relationship with reference to the longitudinal axis of the frame and the blades of each rotor being positioned at a positive dihedral angle relatively to its axis of rotation.

12. A helicopter kite comprising a frame, a pair of plural-blade rotors rotatably mounted in tandem on said frame with their axes of rotation inclined upwardly and rearwardly thereto, an approximately vertical tail fin disposed rearwardly on said frame, one of said rotors being mounted on said frame and the other rotor on said tail fin, and a connection for attaching a flexible towing member to the forward portion of said frame.

ROBERT W. FERNSTRUM.

REFERENCES CITED

The following references are of record in the file of this patent:

UNITED STATES PATENTS

| Number | Name | Date |
| --- | --- | --- |
| 2,074,327 | De Courcy | Mar. 23, 1937 |
| 2,151,349 | Fromme | Mar. 21, 1939 |
| 2,181,477 | Chupp | Nov. 28, 1939 |
| 2,222,402 | Carrasco | Nov. 19, 1940 |